United States Patent
Egerton et al.

(10) Patent No.: US 10,437,126 B2
(45) Date of Patent: Oct. 8, 2019

(54) MULTI-PANE DYNAMIC WINDOW AND METHOD FOR MAKING SAME

(71) Applicant: View, Inc., Milpitas, CA (US)

(72) Inventors: Peter Egerton, Windsor, CA (US); Drew Gaskell, Santa Rosa, CA (US)

(73) Assignee: View, Inc., Milpitas, CA (US)

( * ) Notice: Subject to any disclaimer, the term of this patent is extended or adjusted under 35 U.S.C. 154(b) by 0 days.

(21) Appl. No.: 15/444,152

(22) Filed: Feb. 27, 2017

(65) Prior Publication Data

US 2017/0168367 A1    Jun. 15, 2017

Related U.S. Application Data

(63) Continuation of application No. 15/130,819, filed on Apr. 15, 2016, now Pat. No. 9,618,819, which is a
(Continued)

(51) Int. Cl.
*G02F 1/153*    (2006.01)
*G02F 1/15*     (2019.01)
(Continued)

(52) U.S. Cl.
CPC ............... *G02F 1/153* (2013.01); *E06B 3/66* (2013.01); *E06B 3/6722* (2013.01); *E06B 9/24* (2013.01); *G02B 5/23* (2013.01); *G02F 1/0126* (2013.01); *G02F 1/0147* (2013.01); *G02F 1/13336* (2013.01); *G02F 1/133308* (2013.01); *G02F 1/15* (2013.01); *G02F 1/155* (2013.01); *G02F 1/157* (2013.01); *G02F 1/1533* (2013.01); *G02F 1/163* (2013.01); *E06B 2009/2405* (2013.01);
(Continued)

(58) Field of Classification Search
CPC .......... G02F 1/163; G02F 1/15; G02F 1/0147; G02F 2001/1515; G02F 2001/1512; G02F 2202/14
USPC .................................................. 359/238-279
See application file for complete search history.

(56) References Cited

U.S. PATENT DOCUMENTS

| | | |
|---|---|---|
| 4,129,861 A | 12/1978 | Giglia |
| 4,832,468 A | 5/1989 | Ito et al. |
| 4,923,289 A | 5/1990 | Demiryont |
| 5,076,673 A | 12/1991 | Lynam et al. |
| 5,140,455 A | 8/1992 | Varaprasad et al. |

(Continued)

FOREIGN PATENT DOCUMENTS

| | | |
|---|---|---|
| CN | 1537257 A | 10/2004 |
| CN | 102388340 A | 3/2012 |

(Continued)

OTHER PUBLICATIONS

Preliminary Amendment for U.S. Appl. No. 15/039,370, filed Mar. 30, 2017.
(Continued)

*Primary Examiner* — Mahidere S Sahle
(74) *Attorney, Agent, or Firm* — Weaver Austin Villeneuve & Sampson LLP; Brian D. Griedel

(57) ABSTRACT

A window assembly comprises a plurality of dynamic electrochromic zones formed on a single transparent substrate in which at least two electrochromic zones are independently controllable. In one exemplary embodiment, the window assembly comprises an Insulated Glass Unit (IGU), and at least one transparent substrate comprises a lite. In another exemplary embodiment, the IGU comprises at least two lites in which at least one lite comprises a plurality of independently controllable dynamic zones.

25 Claims, 4 Drawing Sheets

Related U.S. Application Data continuation of application No. 14/608,452, filed on Jan. 29, 2015, now Pat. No. 9,341,909, which is a continuation of application No. 14/266,576, filed on Apr. 30, 2014, now Pat. No. 9,110,345, which is a continuation of application No. 13/903,905, filed on May 28, 2013, now Pat. No. 8,749,870, which is a continuation of application No. 12/145,892, filed on Jun. 25, 2008, now Pat. No. 8,514,476.

(51) Int. Cl.
| | | |
|---|---|---|
| *E06B 9/24* | (2006.01) | |
| *G02F 1/01* | (2006.01) | |
| *G02F 1/155* | (2006.01) | |
| *G02F 1/163* | (2006.01) | |
| *E06B 3/66* | (2006.01) | |
| *G02F 1/1333* | (2006.01) | |
| *E06B 3/67* | (2006.01) | |
| *G02B 5/23* | (2006.01) | |
| *G02F 1/157* | (2006.01) | |

(52) U.S. Cl.
CPC ............ *E06B 2009/2417* (2013.01); *E06B 2009/2464* (2013.01); *G02F 1/1508* (2013.01); *G02F 2201/123* (2013.01); *G02F 2202/14* (2013.01); *G02F 2203/01* (2013.01)

(56) References Cited

U.S. PATENT DOCUMENTS

| | | |
|---|---|---|
| 5,142,407 A | 8/1992 | Varaprasad et al. |
| 5,145,609 A | 9/1992 | Varaprasad et al. |
| 5,151,816 A | 9/1992 | Varaprasad et al. |
| 5,187,607 A | 2/1993 | Endo et al. |
| 5,233,461 A | 8/1993 | Dornan et al. |
| 5,239,405 A | 8/1993 | Varaprasad et al. |
| 5,340,503 A | 8/1994 | Varaprasad et al. |
| 5,379,146 A | 1/1995 | Defendini |
| 5,471,338 A | 11/1995 | Yu et al. |
| 5,472,643 A | 12/1995 | Varaprasad et al. |
| 5,500,760 A | 3/1996 | Varaprasad et al. |
| 5,567,360 A | 10/1996 | Varaprasad et al. |
| 5,657,149 A | 8/1997 | Buffat et al. |
| 5,657,150 A | 8/1997 | Kallman et al. |
| 5,668,663 A | 9/1997 | Varaprasad et al. |
| 5,724,175 A | 3/1998 | Hichwa et al. |
| 5,724,176 A | 3/1998 | Nishikitani et al. |
| 5,724,187 A | 3/1998 | Varaprasad et al. |
| 5,777,603 A | 7/1998 | Jaeger |
| 5,805,330 A | 9/1998 | Byker et al. |
| 5,814,195 A | 9/1998 | Lehan et al. |
| 5,830,336 A | 11/1998 | Schulz |
| 5,953,150 A | 9/1999 | Smarto et al. |
| 5,969,847 A | 10/1999 | Coleman et al. |
| 5,985,184 A | 11/1999 | Lynam |
| 5,995,271 A | 11/1999 | Zieba et al. |
| 6,001,487 A | 12/1999 | Ladang et al. |
| 6,002,511 A | 12/1999 | Varaprasad et al. |
| 6,039,850 A | 3/2000 | Schulz |
| 6,045,643 A | 4/2000 | Byker et al. |
| 6,045,896 A | 4/2000 | Boire et al. |
| 6,055,088 A | 4/2000 | Fix et al. |
| 6,055,089 A | 4/2000 | Schulz et al. |
| 6,074,279 A | 6/2000 | Yoshimura et al. |
| 6,094,292 A | 7/2000 | Goldner et al. |
| 6,118,573 A | 9/2000 | Kubo et al. |
| 6,143,209 A | 11/2000 | Lynam |
| 6,154,306 A | 11/2000 | Varaprasad et al. |
| 6,166,849 A | 12/2000 | Coleman et al. |
| 6,178,034 B1 | 1/2001 | Allemand et al. |
| 6,204,953 B1 | 3/2001 | Zieba et al. |
| 6,207,083 B1 | 3/2001 | Varaprasad et al. |
| 6,244,716 B1 | 6/2001 | Steenwyk et al. |
| 6,261,641 B1 | 7/2001 | Zieba et al. |
| 6,337,758 B1 | 1/2002 | Beteille et al. |
| 6,433,913 B1 | 8/2002 | Bauer et al. |
| 6,471,360 B2 | 10/2002 | Rukavina et al. |
| 6,493,128 B1 | 12/2002 | Agrawal et al. |
| 6,515,787 B1 | 2/2003 | Westfall et al. |
| 6,529,308 B2 | 3/2003 | Beteille et al. |
| 6,535,126 B2 | 3/2003 | Lin et al. |
| 6,559,411 B2 | 5/2003 | Borgeson et al. |
| 6,561,460 B2 | 5/2003 | Rukavina et al. |
| 6,639,709 B2 | 10/2003 | Vincent et al. |
| 6,749,103 B1 | 6/2004 | Ivanov et al. |
| 6,783,099 B2 | 8/2004 | Rukavina et al. |
| 6,795,226 B2 | 9/2004 | Agrawal et al. |
| 6,798,556 B2 | 9/2004 | Tench et al. |
| 6,822,778 B2 | 11/2004 | Westfall et al. |
| 6,853,472 B2 | 2/2005 | Warner et al. |
| 6,862,125 B2 | 3/2005 | Warner et al. |
| 6,906,842 B2 | 6/2005 | Agrawal et al. |
| 6,919,530 B2 | 7/2005 | Borgeson et al. |
| 6,937,380 B2 | 8/2005 | Fanton et al. |
| 6,995,891 B2 | 2/2006 | Agrawal et al. |
| 6,995,892 B2 | 2/2006 | Fanton et al. |
| 7,002,720 B2 | 2/2006 | Beteille et al. |
| 7,004,592 B2 | 2/2006 | Varaprasad et al. |
| 7,033,655 B2 | 4/2006 | Beteille et al. |
| 7,114,643 B2 | 10/2006 | Ivanov et al. |
| 7,130,101 B2 | 10/2006 | Rukavina et al. |
| 7,133,181 B2 | 11/2006 | Greer |
| 7,146,703 B2 | 12/2006 | Ivanov |
| 7,173,750 B2 | 2/2007 | Rukavina |
| 7,202,987 B2 | 4/2007 | Varaprasad et al. |
| 7,230,748 B2 | 6/2007 | Giron et al. |
| 7,248,392 B2 | 7/2007 | Rukavina et al. |
| 7,256,923 B2 | 8/2007 | Liu et al. |
| 7,277,215 B2 | 10/2007 | Greer |
| 7,300,166 B2 | 11/2007 | Agrawal et al. |
| 7,317,106 B2 | 1/2008 | Warner et al. |
| 7,324,261 B2 | 1/2008 | Tonar et al. |
| 7,333,258 B2 | 2/2008 | Yang et al. |
| 7,362,491 B2 | 4/2008 | Busick et al. |
| 7,372,610 B2 | 5/2008 | Burdis et al. |
| 7,450,294 B2 | 11/2008 | Weidner |
| 7,467,741 B2 | 12/2008 | Wickersham, Jr. et al. |
| 7,531,101 B2 | 5/2009 | Beteille |
| 7,649,668 B2 | 1/2010 | Fanton et al. |
| 7,710,671 B1 | 5/2010 | Kwak et al. |
| 7,719,751 B2 | 5/2010 | Egerton et al. |
| 7,724,416 B2 | 5/2010 | Miller |
| 7,869,114 B2 | 1/2011 | Valentin et al. |
| 7,894,119 B2 | 2/2011 | Valentin et al. |
| 7,929,194 B2 | 4/2011 | Legois et al. |
| 7,961,375 B2 | 6/2011 | Phillips |
| 7,990,603 B2 | 8/2011 | Ash et al. |
| 8,035,882 B2 | 10/2011 | Fanton et al. |
| 8,164,818 B2 | 4/2012 | Collins et al. |
| 8,213,074 B1 | 7/2012 | Shrivastava et al. |
| 8,270,059 B2 | 9/2012 | Friedman et al. |
| 8,514,476 B2 | 8/2013 | Egerton et al. |
| 8,749,870 B2 | 6/2014 | Egerton et al. |
| 8,780,432 B1 | 7/2014 | Nguyen |
| 9,110,345 B2 | 8/2015 | Egerton et al. |
| 9,341,909 B2 | 5/2016 | Egerton et al. |
| 9,341,912 B2 | 5/2016 | Shrivastava et al. |
| 9,618,819 B2 | 4/2017 | Egerton et al. |
| 2002/0021481 A1 | 2/2002 | Lin et al. |
| 2002/0041443 A1 | 4/2002 | Varaprasad et al. |
| 2002/0075552 A1 | 6/2002 | Poll et al. |
| 2002/0135881 A1 | 9/2002 | Rukavina et al. |
| 2002/0149829 A1 | 10/2002 | Mochizuka et al. |
| 2003/0227663 A1 | 12/2003 | Agrawal et al. |
| 2004/0047050 A1 | 3/2004 | Bauer et al. |
| 2004/0150866 A1 | 8/2004 | Tench et al. |
| 2004/0257633 A1 | 12/2004 | Agrawal et al. |
| 2005/0002081 A1 | 1/2005 | Beteille et al. |
| 2005/0168793 A1 | 8/2005 | Fanton et al. |
| 2006/0077511 A1 | 4/2006 | Poll et al. |
| 2006/0187608 A1 | 8/2006 | Stark |
| 2007/0002420 A1 | 1/2007 | Rukavina |

(56) References Cited

U.S. PATENT DOCUMENTS

| | | |
|---|---|---|
| 2007/0002422 A1 | 1/2007 | O'Shaughnessy |
| 2007/0020442 A1 | 1/2007 | Giron et al. |
| 2007/0067048 A1 | 3/2007 | Bechtel et al. |
| 2007/0103761 A1 | 5/2007 | Giron et al. |
| 2007/0133078 A1 | 6/2007 | Fanton et al. |
| 2007/0268550 A1 | 11/2007 | Liu et al. |
| 2008/0042012 A1 | 2/2008 | Callahan et al. |
| 2008/0074724 A1 | 3/2008 | Agrawal et al. |
| 2008/0092456 A1 | 4/2008 | Millett et al. |
| 2008/0115428 A1 | 5/2008 | Schlam et al. |
| 2008/0204850 A1 | 8/2008 | Agrawal |
| 2009/0058295 A1 | 3/2009 | Auday et al. |
| 2009/0067031 A1 | 3/2009 | Piroux et al. |
| 2009/0097098 A1 | 4/2009 | Piroux |
| 2009/0110918 A1 | 4/2009 | Jacquiod et al. |
| 2009/0114928 A1 | 5/2009 | Messere et al. |
| 2009/0127126 A1 | 5/2009 | Torvund |
| 2009/0130409 A1 | 5/2009 | Reutler et al. |
| 2009/0148642 A1 | 6/2009 | Mauser et al. |
| 2009/0174300 A1 | 7/2009 | Jousse et al. |
| 2009/0181203 A1 | 7/2009 | Valentin et al. |
| 2009/0251758 A1 | 10/2009 | Valentin et al. |
| 2009/0262411 A1 | 10/2009 | Karmhag et al. |
| 2009/0297806 A1 | 12/2009 | Dawson-Elli et al. |
| 2009/0323155 A1 | 12/2009 | Phillips |
| 2009/0323160 A1 | 12/2009 | Egerton et al. |
| 2010/0067090 A1 | 3/2010 | Egerton et al. |
| 2010/0203296 A1 | 8/2010 | Tsai et al. |
| 2010/0208326 A1 | 8/2010 | Kwak et al. |
| 2010/0225988 A1* | 9/2010 | Kalkanoglu ............ B44F 1/10 359/267 |
| 2010/0243427 A1 | 9/2010 | Kozlowski et al. |
| 2010/0311204 A1 | 12/2010 | Komin et al. |
| 2011/0043885 A1 | 2/2011 | Lamine et al. |
| 2011/0048614 A1 | 3/2011 | Veerasamy et al. |
| 2011/0051221 A1 | 3/2011 | Veerasamy |
| 2011/0059275 A1 | 3/2011 | Stark |
| 2011/0100709 A1 | 5/2011 | Wang et al. |
| 2011/0148218 A1 | 6/2011 | Rozbicki |
| 2011/0216389 A1 | 9/2011 | Piroux et al. |
| 2011/0260961 A1 | 10/2011 | Burdis |
| 2011/0266138 A1 | 11/2011 | Wang et al. |
| 2011/0267672 A1 | 11/2011 | Sbar et al. |
| 2011/0299149 A1 | 12/2011 | Park et al. |
| 2011/0304899 A1 | 12/2011 | Kwak et al. |
| 2012/0033287 A1 | 2/2012 | Friedman et al. |
| 2012/0069420 A1 | 3/2012 | Suzuki |
| 2012/0147449 A1 | 6/2012 | Bhatnagar et al. |
| 2012/0194895 A1 | 8/2012 | Podbelski et al. |
| 2012/0200908 A1 | 8/2012 | Bergh et al. |
| 2012/0239209 A1 | 9/2012 | Brown et al. |
| 2012/0300280 A1 | 11/2012 | Murphy et al. |
| 2012/0327499 A1 | 12/2012 | Parker et al. |
| 2013/0021659 A1 | 1/2013 | Friedman et al. |
| 2013/0201545 A1 | 8/2013 | Frey et al. |
| 2013/0222877 A1 | 8/2013 | Greer et al. |
| 2013/0222878 A1 | 8/2013 | Greer et al. |
| 2013/0258436 A1 | 10/2013 | Podbelski et al. |
| 2013/0271813 A1 | 10/2013 | Brown |
| 2013/0271814 A1 | 10/2013 | Brown |
| 2013/0271815 A1 | 10/2013 | Pradhan et al. |
| 2013/0301104 A1 | 11/2013 | Egerton et al. |
| 2014/0055443 A1 | 2/2014 | Threlkel et al. |
| 2014/0133005 A1 | 5/2014 | Sbar et al. |
| 2014/0177028 A1 | 6/2014 | Shrivastava et al. |
| 2014/0320947 A1 | 10/2014 | Egerton et al. |
| 2015/0060648 A1 | 3/2015 | Brown et al. |
| 2015/0077829 A1 | 3/2015 | Greer et al. |
| 2015/0092259 A1 | 4/2015 | Greer et al. |
| 2015/0177586 A1 | 6/2015 | Egerton et al. |
| 2015/0338713 A1 | 11/2015 | Brown |
| 2015/0362817 A1 | 12/2015 | Patterson et al. |
| 2015/0362818 A1 | 12/2015 | Greer |
| 2016/0154290 A1 | 6/2016 | Brown et al. |
| 2016/0251894 A1 | 9/2016 | Shrivastava et al. |
| 2016/0306249 A1 | 10/2016 | Egerton et al. |
| 2016/0363799 A1 | 12/2016 | West et al. |
| 2017/0130523 A1 | 5/2017 | Shrivastava et al. |
| 2018/0284555 A1 | 10/2018 | Klawuhn et al. |
| 2019/0230776 A1 | 7/2019 | Casey et al. |
| 2019/0242184 A1 | 8/2019 | Shrivastava et al. |

FOREIGN PATENT DOCUMENTS

| | | |
|---|---|---|
| DE | 102006042538 | 3/2008 |
| DE | 102014220818 A1 | 4/2016 |
| EP | 0356099 A2 | 2/1990 |
| EP | 0470867 | 2/1992 |
| EP | 0851271 A2 | 7/1998 |
| EP | 0950568 A1 | 10/1999 |
| EP | 1012661 A | 6/2000 |
| EP | 1420287 A1 | 5/2004 |
| EP | 1484634 A1 | 12/2004 |
| EP | 2348357 | 7/2011 |
| EP | 2815960 A | 12/2014 |
| FR | 2957159 A1 | 9/2011 |
| GB | 2190760 A | 11/1987 |
| JP | S55-153982 A | 12/1980 |
| JP | S61-082821 U | 5/1986 |
| JP | S61-176012 A | 8/1986 |
| JP | S61-190815 A | 8/1986 |
| JP | S61-171034 U | 10/1986 |
| JP | S61-229610 A | 10/1986 |
| JP | S62-019631 U | 2/1987 |
| JP | H01-270032 A | 10/1989 |
| JP | H02-176728 A | 7/1990 |
| JP | H02-308228 A | 12/1990 |
| JP | H05-173191 A | 7/1993 |
| JP | H07-139201 A | 5/1995 |
| JP | 2002-249346 | 9/2002 |
| JP | 2003-146072 A | 5/2003 |
| JP | 2004-093873 | 3/2004 |
| JP | 2004-531770 | 10/2004 |
| JP | 2006-243485 A | 9/2006 |
| JP | 2007-248604 A | 9/2007 |
| JP | 2008-507000 | 3/2008 |
| WO | WO1998/038547 | 9/1998 |
| WO | WO1999/005566 | 2/1999 |
| WO | WO2003/001290 | 1/2003 |
| WO | WO03/012541 A2 | 2/2003 |
| WO | WO03/012541 A3 | 2/2003 |
| WO | WO2005/076061 | 8/2005 |
| WO | WO2006/052067 | 5/2006 |
| WO | WO2007/100921 A2 | 9/2007 |
| WO | WO2008/043951 | 4/2008 |
| WO | WO2009/145876 | 12/2009 |
| WO | WO2009/148861 | 12/2009 |
| WO | WO2009/158510 | 12/2009 |
| WO | WO2011/010067 | 1/2011 |
| WO | WO2011/028253 | 3/2011 |
| WO | WO2011/028254 | 3/2011 |
| WO | WO2011/050291 | 4/2011 |
| WO | WO2011/109688 | 9/2011 |
| WO | WO2011/133294 A1 | 10/2011 |
| WO | WO2012/145155 | 10/2012 |
| WO | WO2013/090209 A1 | 6/2013 |
| WO | WO2013/130781 A1 | 9/2013 |
| WO | WO2013/138535 A1 | 9/2013 |
| WO | WO2014/078429 | 5/2014 |
| WO | WO2015/050946 A1 | 4/2015 |
| WO | WO2015/095615 A1 | 6/2015 |
| WO | WO2015/171886 | 11/2015 |
| WO | WO2016/058695 A1 | 4/2016 |
| WO | WO2016/085964 | 6/2016 |
| WO | WO2017/059362 A1 | 4/2017 |
| WO | WO2017/075472 | 5/2017 |

OTHER PUBLICATIONS

U.S. Office Action dated Nov. 8, 2012 for U.S. Appl. No. 12/145,892.
U.S. Office Action dated May 25, 2012 for U.S. Appl. No. 12/145,892.
U.S. Office Action dated Feb. 3, 2011 for U.S. Appl. No. 12/145,892.
U.S. Office Action dated Aug. 19, 2010 for U.S. Appl. No. 12/145,892.

(56) References Cited

OTHER PUBLICATIONS

U.S. Notice of Allowance dated Feb. 25, 2013 for U.S. Appl. No. 12/145,892.
U.S. Office Action dated Oct. 3, 2013 for U.S. Appl. No. 13/903,905.
U.S. Notice of Allowance dated Apr. 14, 2014 for U.S. Appl. No. 13/903,905.
U.S. Office Action dated Aug. 11, 2014 for U.S. Appl. No. 14/266,576.
U.S. Final Office Action dated Jan. 22, 2015 for U.S. Appl. No. 14/266,576.
U.S. Notice of Allowance dated Apr. 30, 2015 for U.S. Appl. No. 14/266,576.
U.S. Office Action dated Jun. 5, 2015 for U.S. Appl. No. 14/137,644.
Notice of Allowance dated Jan. 14, 2016 for U.S. Appl. No. 14/137,644.
U.S. Office Action dated Jul. 2, 2015 for U.S. Appl. No. 14/608,452.
U.S. Notice of Allowance dated Jan. 15, 2016 for U.S. Appl. No. 14/608,452.
U.S. Notice of Allowance dated Nov. 30, 2016 for for U.S. Appl. No. 15/130,819.
U.S. Notice of Allowance dated Mar. 11, 2010 for U.S. Appl. No. 12/212,482.
U.S. Office Action dated Jun. 16, 2017 for U.S. Appl. No. 15/039,370.
U.S. Office Action dated Jul. 3, 2017 for U.S. Appl. No. 15/094,897.
CN Office Action dated Dec. 5, 2012 in CN200980124126.7.
CN Office Action dated Sep. 4, 2013 in CN200980124126.7.
CN Office Action dated Apr. 18, 2016 in CN Application No. 201380059263.3.
CN Office Action dated Dec. 14, 2016 in CN Application No. 201380059263.3.
EP Search Report dated Mar. 20, 2012 in EP09771042.0.
EP Search Report dated Jun. 25, 2015 in EP09815048.5.
EP Search Report dated Sep. 23, 2015 in EP15160755.3.
Partial EP Search Report dated May 20, 2016 in EP13855151.0.
Extended EP Search Report dated Jul. 13, 2016 in EP13855151.0.
International Preliminary Report on Patentability dated Jan. 13, 2011 in PCT/US2009/048679.
International Search Report and Written Opinion dated Feb. 17, 2010 in PCT/US2009/048679.
International Preliminary Report on Patentability dated Mar. 22, 2011 in PCT/US2009/56928.
International Search Report and Written Opinion dated May 4, 2010 in PCT/US2009/56928.
International Preliminary Report on Patentability dated May 28, 2015 in PCT/US2013/069913.
International Search Report and Written Opinion dated Feb. 18, 2014 in PCT/US2013/069913.
International Search Report and Written Opinion dated Dec. 13, 2016 in PCT/US16/55005.
International Search Report dated Mar. 17, 2015 in PCT/US2014/071314.
JP Office Action dated Oct. 9, 2012 for JP2011-516666.
JP Office Action dated Apr. 5, 2013 in JP2011-516666.
CN Office Action dated Jun. 26, 2017 in CN201380059263.3.
EP Extended Search Report dated Jun. 21, 2017 in EP14872953.6.
E.S. Lee et al., Advancement of Electrochromic Windows. California Energy Commission, PIER. Publication No. CEC-500-2006-052, Apr. 2006.
Tseng, C-Y et al., "Improved performance mechanism of III-V compound triple-junction solar cell using hybrid electrode structure," Solar Energy, vol. 89, Jan. 19, 2013, pp. 17-22.
U.S. Final Office Action dated Dec. 29, 2017 for U.S. Appl. No. 15/039,370.
EP Intention to Grant & Annex with Complementary Search dated Apr. 19, 2018 in EP09815048.5.
International Preliminary Report on Patentability dated Apr. 12, 2018 in PCT/US16/55005.
International Preliminary Report on Patentability dated Jun. 30, 2016 in PCT/US2014/071314.
U.S. Appl. No. 15/762,077, filed Mar. 21, 2018, Klawuhn et al.
U.S. Office Action dated Oct. 19, 2018 for U.S. Appl. No. 15/039,370.
U.S. Final Office Action dated May 3, 2018 for U.S. Appl. No. 15/094,897.
U.S. Appl. No. 16/191,138, filed Nov. 14, 2018, Shrivastava et al.
U.S. Preliminary Amendment dated Nov. 19, 2018 in U.S. Appl. No. 16/191,138.

* cited by examiner

MULTI-PANE DYNAMIC WINDOW AND METHOD FOR MAKING SAME

CROSS REFERENCE TO RELATED APPLICATION

This application is a continuation of U.S. patent application Ser. No. 15/130,819, filed on Apr. 15, 2016 and titled "MULTI-PANE DYNAMIC WINDOW AND METHOD FOR MAKING SAME," which is a continuation of U.S. patent application Ser. No. 14/608,452, filed on Jan. 29, 2015 and titled "MULTI-PANE DYNAMIC WINDOW AND METHOD FOR MAKING SAME," now U.S. Pat. No. 9,341,909, which is a continuation of U.S. patent application Ser. No. 14/266,576, filed on Apr. 30, 2014 and titled "MULTI-PANE DYNAMIC WINDOW AND METHOD FOR MAKING SAME," now U.S. Pat. No. 9,110,345, which is a continuation of U.S. patent application Ser. No. 13/903,905, filed on May 28, 2013 and titled "MULTI-PANE DYNAMIC WINDOW AND METHOD FOR MAKING SAME," now U.S. Pat. No. 8,749,870, which is a continuation of U.S. patent application Ser. No. 12/145,892, filed on Jun. 25, 2008 and titled "MULTI-PANE DYNAMIC WINDOW AND METHOD FOR MAKING SAME," now U.S. Pat. No. 8,514,476, each of these applications is hereby incorporated by reference in their entirety and for all purposes.

BACKGROUND

The subject matter disclosed herein relates to dynamic windows, such as smart windows. More particularly, the subject matter disclosed herein relates to dynamic multi-pane Insulated Glass Units (IGUs) in which at least one pane comprises a plurality of independently controllable dynamic zones.

BRIEF DESCRIPTION OF THE DRAWINGS

The subject matter disclosed herein is illustrated by way of example and not by limitation in the accompanying figures in which like reference numerals indicate similar elements and in which.

DETAILED DESCRIPTION

The word "exemplary" is used herein to mean "serving as an example, instance, or illustration." Any embodiment described herein as "exemplary" is not to be construed as necessarily preferred or advantageous over other embodiments.

The subject matter disclosed herein relates to multi-pane Insulated Glass Units (IGUs) comprising at least one pane, or lite, having a dynamic (i.e., a variable visible transmittance (Tvis) and/or variable Solar Heat Gain Coefficient (SHGC)) coating on a surface of the pane that provides at least two, independently controllable dynamic zones.

Figure 1B:
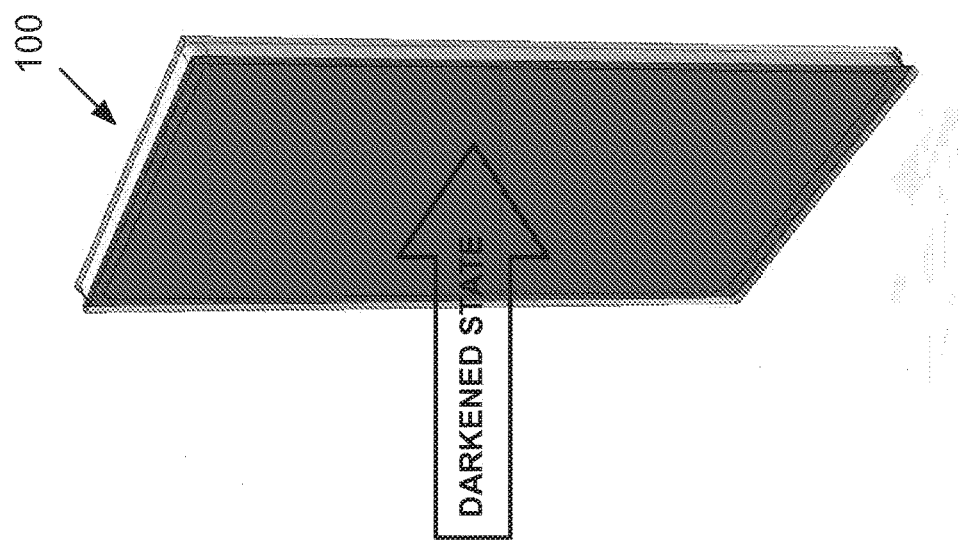
FIGS. 1A and 1B depict a conventional dynamic IGU that utilizes a dynamic coating in a well-known manner to change the visible transmittance through the IGU.
Figure 1A:
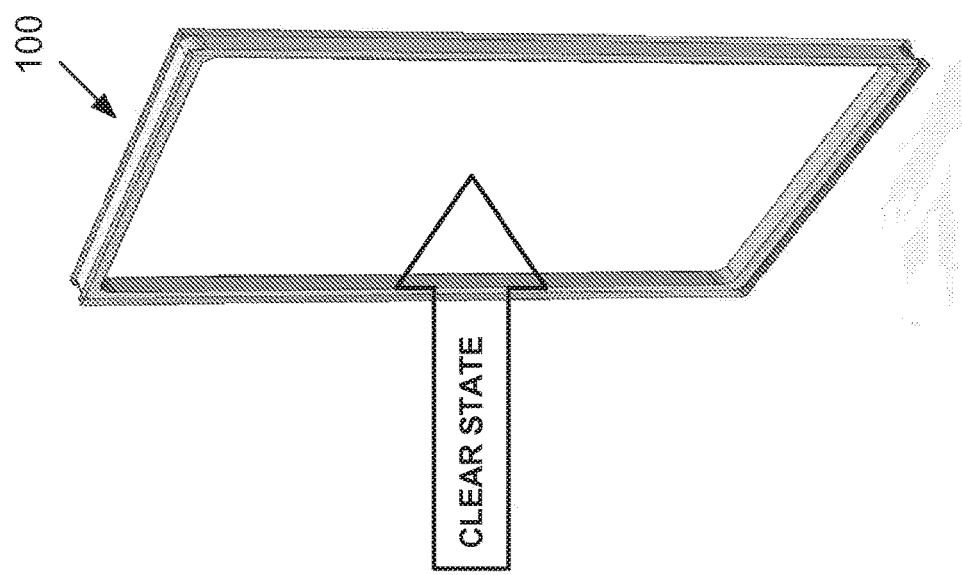

FIGS. 1A and 1B depict a conventional dynamic IGU 100 that utilizes a dynamic coating in a well-known manner to change the visible transmittance through the IGU. In particular, FIG. 1A depicts conventional dynamic IGU 100 in a clear state, and FIG. 1B depicts conventional dynamic IGU 100 in a darkened state.

Masking has been one conventional approach that has been tried for making a dynamic IGU that has multiple independently controllable zones. Masking, nevertheless, includes the problems of producing short circuits that require elimination and of producing visual defects in the isolation area between two independently controlled dynamic zones. Other techniques that have been tried include difficult manufacturing techniques that significantly increase the production costs associated with such IGUs. Thus, conventional practical sealed IGUs have been restricted to either a single dynamic zone or several separately glazed IGUs, each having a single dynamic zone, formed together into a single IGU assembly.

Multi-zone, dynamic windows according to the subject matter disclosed herein provide many advantages over conventional dynamic IGUs, such as permitting optimized harvesting of natural daylight through one or more dynamic zones, while being able to maximize solar-control advantages in the other dynamic zones of the window. Different dynamic zones can be created at any arbitrary distance from the edge of a window in order to satisfy diverse design goals and requirements.

Figure 2:
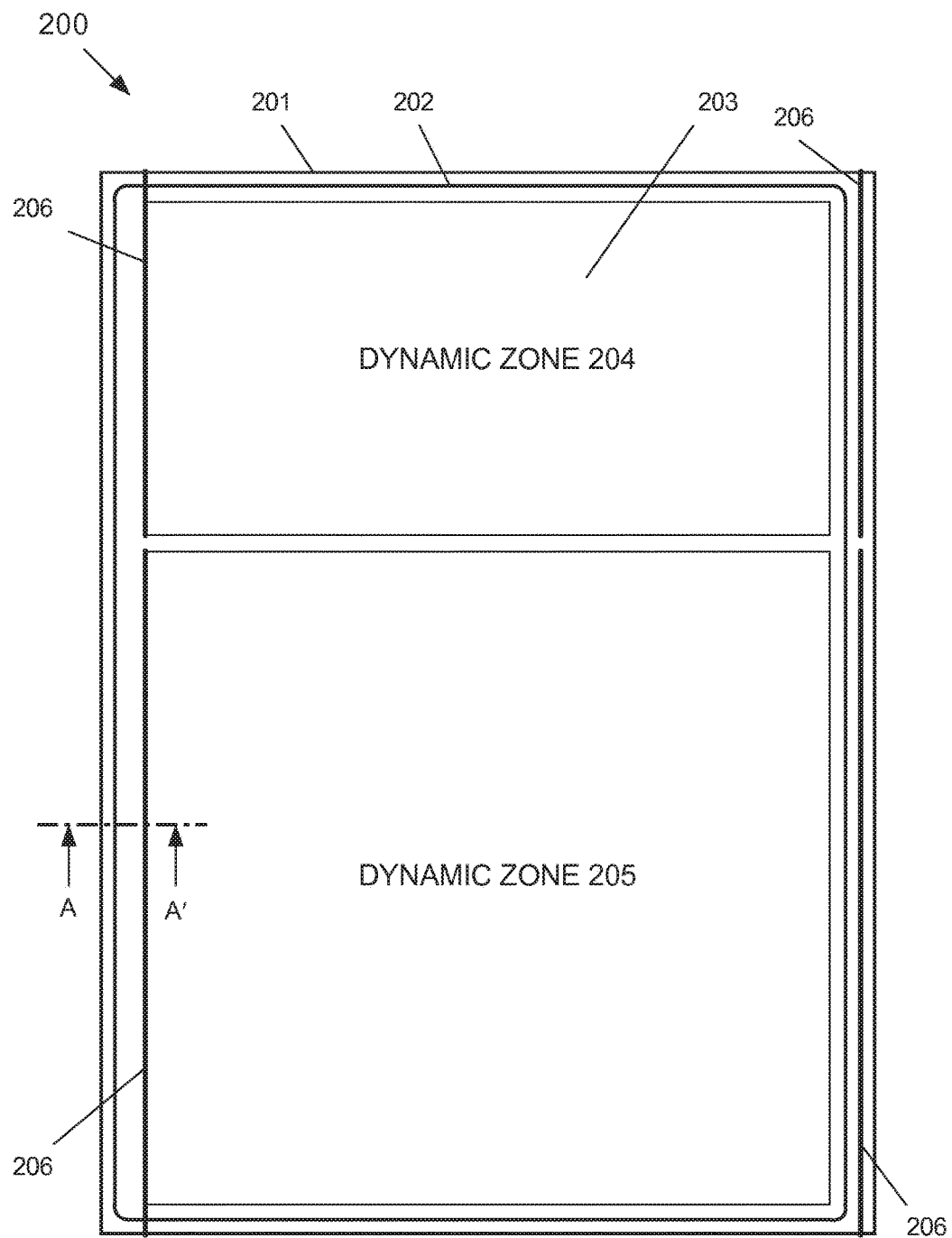
FIG. 2 depicts one exemplary embodiment of a multi-pane IGU having multiple dynamic zones according to the subject matter disclosed herein.

FIG. 2 depicts one exemplary embodiment of a multi-pane IGU 200 having multiple dynamic zones according to the subject matter disclosed herein. IGU 200 comprises an IGU frame 201, a seal 202, at least two window panes (or lites) 203. IGU frame 201 holds and supports each window pane 203 in a well-known manner. The space between window panes 203 is sealed by seal 202 in a well-known manner so that the space can be filled in a well-known manner with air and/or an inert gas, such as argon, krypton and/or xenon. Alternatively, the space between the window panes can be evacuated so that the space contains a partial vacuum.

At least one window pane 203 of IGU 200 comprises a first dynamic zone 204 and a second dynamic zone 205. In one exemplary embodiment dynamic zones 204 and 205 are electrochromic dynamic zones. In another exemplary embodiment, at least one dynamic zone could be a photochromic or a thermochromic dynamic zone. Bus bars 206 are coupled to each dynamic zone in a well-known manner in order to independently apply control voltages to each respective dynamic zone. Bus bars 206 are made electrically available at the outside edge of frame 201. Each respective dynamic zone can be independently controlled in a well-known manner based on, for example, internal and/or external light levels, internal and/or external weather conditions, the time of day, the time of year, etc.

Figure 3:
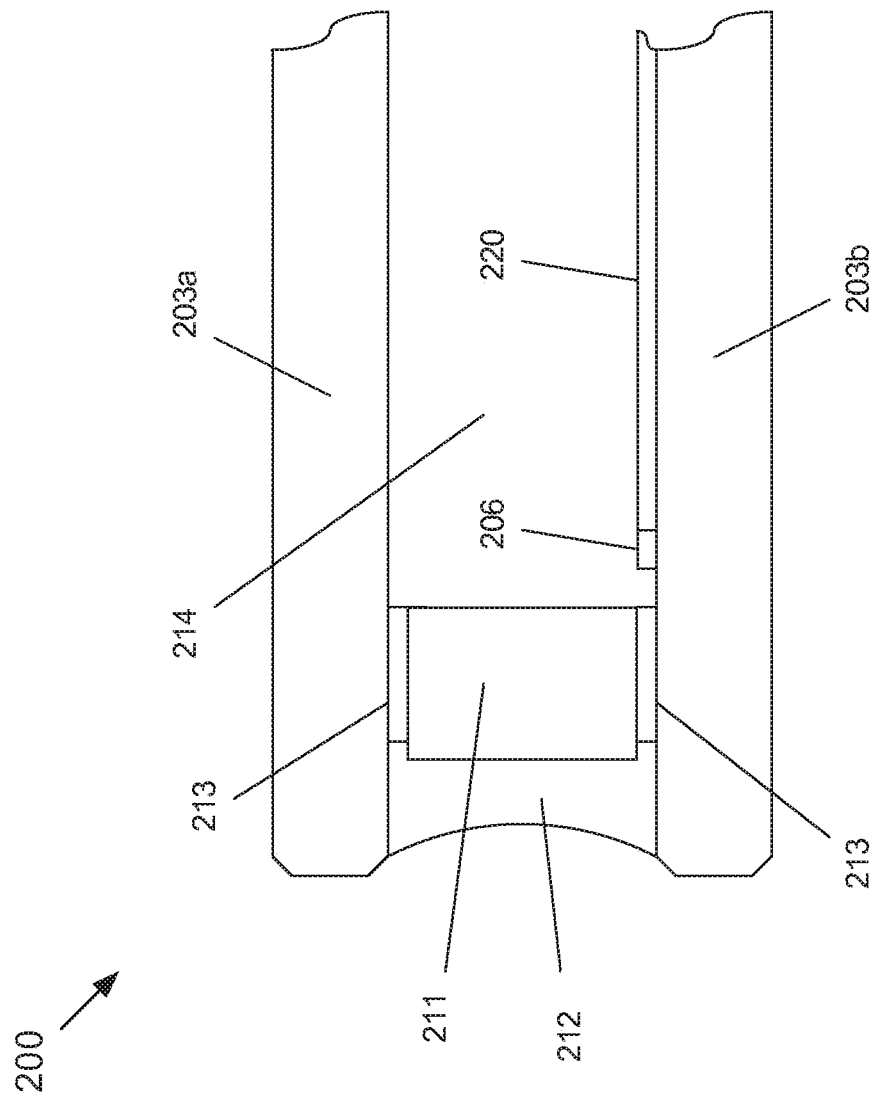
FIG. 3 depicts a cross-sectional view A-A' (shown in FIG. 2) of a portion of multi-pane IGU according to the subject matter disclosed herein.

FIG. 3 depicts a cross-sectional view A-A' (shown in FIG. 2) of a portion of multi-pane IGU 200 according to the subject matter disclosed herein. As shown in FIG. 3, multi-pane IGU 200 comprises a first lite 203a, a second lite 203b, a spacer 211, a first seal 212, and a second seal 213. (Frame 201 is not depicted in FIG. 3.) First and second lites 203a and 203b can be formed from, for example, glass, acrylic and/or polycarbonate. One or both lites 203a and 203b can be transparent or be translucent.

Alternatively, a portion of one or both lites 203a and 203b can be transparent or be translucent. Spacer 211 is positioned in a well-known manner between first lite 203a and second lite 203b to form space 214. In one exemplary embodiment, spacer 211 forms a gap (or space) between first lite 203a and second lite 203b of about 12 mm to about 20 mm. First seal 212, such as a silicon-based seal, and second seal 213, such as a butyl-based seal, form seal 202 (FIG. 2) and hermetically seals space 214 in a well-known manner. Other sealing materials can alternatively or additionally be used. A desiccant (not shown) can, for example, be placed within spacer 211 in a well-known manner for preventing condensation and improving insulating performance of IGU 200.

FIG. 3 also depicts a bus bar 206 and dynamic coating 220 that have been formed on lite 203b. In one exemplary embodiment, dynamic coating 220 is an electrochromic-based coating that forms a dynamic zone. According to the subject matter disclosed herein, both bus bar 206 and dynamic coating 220 are formed across a desired area on lite 203b. A laser scribing and/or ablation process is then used to form very thin, highly isolating lines between desired dynamic zones. The bus bars that are coupled to each respective dynamic zone are made electrically available in a well-known manner through the frame of the IGU. Because each dynamic zone is isolated from other dynamic zones of the IGU, each dynamic zone can be independently controlled to vary the transmittance through the zone.

Several exemplary techniques for forming the layers of an electrochromic dynamic zone in a well-known manner generally comprise physical vapor deposition, sputtering, pyrolytic-coating techniques, wet-chemical techniques, such as a sol gel process, spin-coating techniques, and vacuum-coating techniques.

Bus bars 206 can be formed on substrate 201 prior to forming any dynamic coatings. Alternatively, bus bars 206 can be ultrasonically soldered on to substrate 201 following deposition of the dynamic zones or at an intermediate time during the deposition process. The bus bars are arranged on substrate 201 using form factors that are based on the size and shape of the desired dynamic zones. When the bus bars are formed separately for each dynamic zone, and the dynamic zone is formed as one large zone, laser ablation can be used for separating and isolating one dynamic zone from another dynamic zone. Alternatively, the bus bars may be created along the entire length of an IGU, such as depicted in FIG. 2. For this alternative technique, the laser would be used to ablate and isolate both the dynamic coating zones and the bus bars into distinct dynamic zones. When using this alternative technique, care must be taken for the removal of bus bar material ejected during ablation. Separation lines formed by laser ablation, in general, have a desired narrow width (i.e., between about 10 µm and 100 µm), have a clean edge that provides excellent electrical isolation characteristics between dynamic zones and between bus bars. Alternatively, ablation lines have a width greater than 100 µm can also be used. Lasers that are suitable for producing the ablation lines include solid-state lasers, such as Nd:YAG at a wavelength of 1064 nm, and excimer lasers, such as ArF and KrF excimer lasers respectively emitting at 248 nm and 193 nm. Other solid-state and excimer lasers are also suitable.

Figure 4:
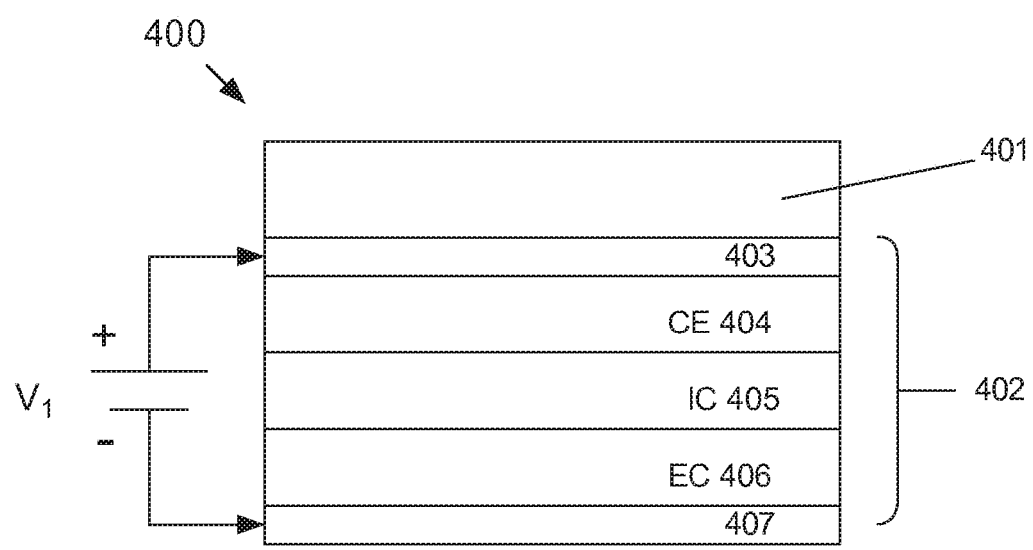
FIG. 4 depicts a sectional view of a first exemplary embodiment of a solid-state electrochromic device that is suitable for a dynamic zone according to the subject matter disclosed herein.

FIG. 4 depicts a sectional view of a first exemplary embodiment of a solid-state electrochromic device 400 that is suitable for a dynamic zone according to the subject matter disclosed herein. Electrochromic device 400 comprises a substrate layer 401 (i.e., lite 203) and a solid-state electrochromic cell 402. Electrochromic cell 402 comprises a transparent conductive layer 403, a counter electrode (CE) layer 404 (anode), an ion conductor (IC) layer 405, an electrochromic (EC) layer 406 (cathode), and a transparent conductive layer 407. Voltage $V_1$ is applied between conductive layer 403 and conductive layer 407 to control the transmittance of cell 402 in a well-known manner. Different voltages can be independently applied to the different cells for the different dynamic zones of an IGU.

Cell 402 can be vacuum deposited in a continuous fashion onto substrate 401. Any deposition method may be used, i.e., electron beam, AC sputtering, DC sputtering or CVD for deposition of the various layers of cell 402. Another exemplary solid-state electrochromic device that is suitable for a dynamic zone is a multi-cell solid-state electrochromic device that is disclosed in U.S. patent application Ser. No. 12/145,846 (now U.S. Pat. No. 7,961,375), entitled "Multi-cell Solid-state Electrochromic Device," invented by Roger Phillips, the disclosure of which is incorporated by reference herein.

Photochromic and thermochromic materials could be used one or more dynamic zones. Suitable photochromic materials include, but are not limited to, triarylmethanes, stilbenes, azastilbenes, nitrones, fulgides, spriropyrans, naphthopyrans, sprio-oxazines, and quinones. Suitable thermochromic materials include, but are not limited to, liquid crystals and leuco dyes. Both photochromic and thermochromic materials can be formed on substrate 201 (FIG. 2) in a well-known manner. No bus bars would be needed for photochromic or thermochromic dynamic zones because light and heat respectively modulate the properties of the materials. One exemplary embodiment using photochromic and/or thermochromic dynamic zones could be a window having at least one electrochromic dynamic zone towards the top of the window that is actively controlled for daylighting and at least one photochromic dynamic zone towards the bottom of the window that self darkens when under direct light.

While only two dynamic zones 204 and 205 are depicted in FIG. 2, it should be understood that any number of dynamic zones can be used. Moreover, while dynamic zones 204 and 205 are depicted as having a generally rectangular shape, the subject matter disclosed herein provides that a plurality of dynamic zones, each having a selected shape, can be used. Further still, while multi-pane IGU 200 is depicted as having a generally rectangular shape, the subject matter disclosed herein provides that a multi-pane IGU of any selected size and shape can be used.

Further, it should be understood that one exemplary embodiment of the subject matter disclosed herein can comprise a window having a single pane, or lite, that comprises a plurality of independently controlled dynamic zones. Another exemplary embodiment of the subject matter disclosed herein comprises an IGU comprising multiple zones of electrochromic window on one pane and clear glass on the other pane. Yet another exemplary embodiment of the subject matter disclosed herein comprises an IGU comprising multiple zones of electrochromic window on one pane and a low-E, tinted, or reflective glass on the other pane. Still another exemplary embodiment of the subject matter disclosed herein comprises an IGU comprising multiple zones of electrochromic window on one pane of the IGU and a patterned or special glass on the other pane in which the patterning or features may match, compliment, and/or contrast the areas of dynamic zones on the first pane. It should be understood that the foregoing exemplary embodiments can be configured so that the lite comprising the plurality of dynamic zones is a clear lite, a low-E lite, a reflective, and/or partially reflective lite.

Moreover, patterning of a lite and/or the characteristics of the lite can accentuate the functions of each dynamic zone in a window. For example, silk screening and/or added scattering features can be added on the opposite pane (i.e., not the pane comprising dynamic zones) corresponding to at least one dynamic zone, for example, for light harvesting in order to improve the effects of daylighting and/or for reducing glare issues. Yet other exemplary embodiments of the subject matter disclosed herein include a window pane comprising a plurality of independently controllable dynamic zones that has been glazed in a frame in a sash or a curtain wall.

Although the foregoing disclosed subject matter has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

What is claimed is:

1. A multi-zone dynamic window, comprising:
   a first transparent or translucent substrate; and
   a plurality of dynamic zones on the first substrate, the plurality of dynamic zones configured for independent control of optical transmittance properties, wherein at least one of the plurality of dynamic zones comprises a photochromic coating or a thermochromic coating disposed on the first substrate and at least one of the plurality of dynamic zones comprises a solid-state electrochromic device coating on the first substrate.

2. The multi-zone dynamic window of claim 1, wherein the photochromic coating comprises a material selected from the group consisting of a triarylmethane, a stilbene, an azastilbene, a nitrone, a fulgide, a spiropyran, a naphthopyran, a spiro-oxazine, and a quinone.

3. The multi-zone dynamic window of claim 1, wherein the thermochromic coating comprises a material is selected from the group consisting of a liquid crystal and a leuco dye.

4. The multi-zone dynamic window of claim 1, wherein the first substrate comprises at least one of glass, acrylic and polycarbonate.

5. The multi-zone dynamic window of claim 1, wherein said at least one of the plurality of dynamic zones comprising the electrochromic coating is located toward the top of the multi-zone dynamic window when installed, the dynamic zone configured for active control of transmittance properties for daylighting and/or reducing glare.

6. The multi-zone dynamic window of claim 5, further comprising a pair of bus bars on the first substrate, the bus bars configured to apply a voltage to the electrochromic coating to control transmittance properties through the dynamic zone independently of the modulation of transmittance properties through other dynamic zones of the plurality of dynamic zones.

7. The multi-zone dynamic window of claim 5, further comprising an electrically isolating line of removed material between said at least one of the plurality of dynamic zones comprising the electrochromic coating and other dynamic zones of the plurality of dynamic zones.

8. The multi-zone dynamic window of claim 7, wherein the electrically isolating line has a width of between about 10 µm and 100 µm.

9. The multi-zone dynamic window of claim 1, wherein the plurality of dynamic zones are configured for independent control of transmittance properties based on one or more of internal light levels, external light levels, weather conditions, time of day, and time of year.

10. The multi-zone dynamic window of claim 1, further comprising a frame, wherein the first substrate is located in the frame configured for installation in a sash or a curtain wall.

11. The multi-zone dynamic window of claim 1, wherein the first substrate is part of an insulated glass unit (IGU).

12. An insulated glass unit (IGU) comprising:
    a pair of parallel lites;
    a spacer between the parallel lites; and
    a seal between each of the parallel lites and the spacer;
    wherein at least one lite has a plurality of dynamic zones, wherein at least one of the plurality of dynamic zones comprises a photochromic coating or a thermochromic coating disposed on the at least one lite and at least one of the plurality of dynamic zones comprises a solid-state electrochromic device coating on the at least one lite.

13. The IGU of claim 12, wherein each of the plurality of dynamic zones is an isolated area of the at least one lite.

14. The IGU of claim 12, wherein the plurality of dynamic zones is configured for independent control of transmittance properties.

15. The IGU of claim 12, wherein the photochromic coating comprises a material selected from the group consisting of a triarylmethane, a stilbene, an azastilbene, a nitrone, a fulgide, a spiropyran, a naphthopyran, a spiro-oxazine, and a quinone.

16. The IGU of claim 12, wherein the thermochromic coating comprises a material is selected from the group consisting of a liquid crystal and a leuco dye.

17. The IGU of claim 12, wherein one or both of the lites comprise at least one of glass, acrylic and polycarbonate.

18. The IGU of claim 12, further comprising a pair of bus bars on the first substrate, the bus bars configured to apply a voltage to the electrochromic coating to control transmittance properties through the dynamic zone independently of the modulation of transmittance properties through other dynamic zones of the plurality of dynamic zones.

19. The IGU of claim 12, further comprising an electrically isolating line of removed material between said at least one of the plurality of dynamic zones comprising the electrochromic coating and other dynamic zones of the plurality of dynamic zones.

20. The IGU of claim 19, wherein the electrically isolating line has a width of between about 10 µm and 100 µm.

21. The IGU of claim 12, wherein the plurality of dynamic zones is configured for independent control of transmittance properties based on one or more of internal light levels, external light levels, weather conditions, time of day, and time of year.

22. The IGU of claim 12, wherein the electrochromic coating comprises a sputtered layer.

23. The IGU of claim 12, wherein the electrochromic coating comprises a sol gel layer.

24. The IGU of claim 12, further comprising a low-E coating or a reflective coating on at least one of the pair of parallel lites.

25. The IGU of claim 12, wherein the at least one lite of the pair of parallel lites comprises a light scattering feature.

* * * * *